Feb. 14, 1950 L. G. ERICKSON 2,497,593
CARRIER CURRENT SIGNALING SYSTEM
Filed Nov. 13, 1947
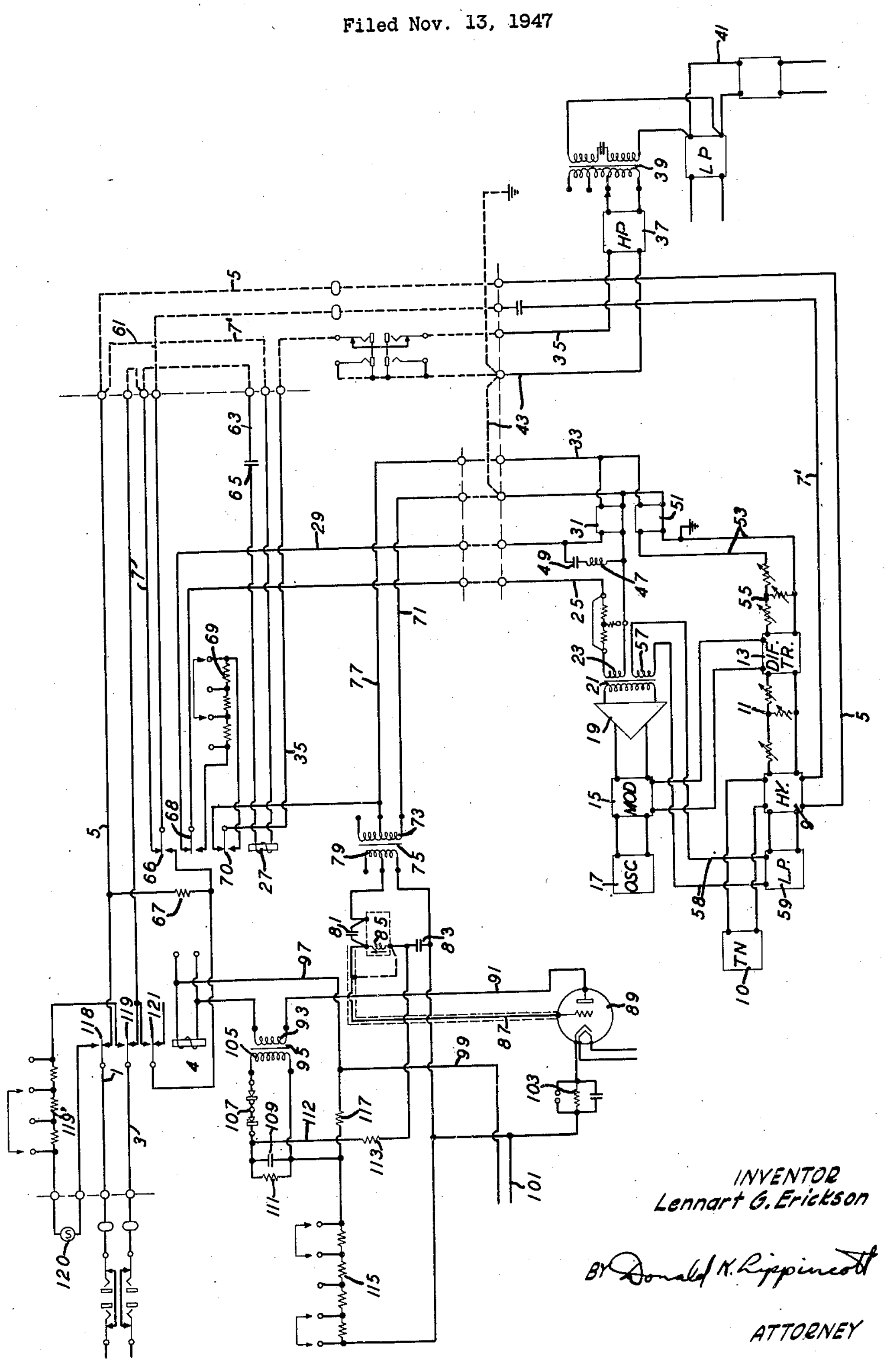
INVENTOR
Lennart G. Erickson
BY Donald K. Lippincott
ATTORNEY Patented Feb. 14, 1950 2,497,593

UNITED STATES PATENT OFFICE 2,497,593

CARRIER CURRENT SIGNALING SYSTEM

Lennart G. Erickson, San Francisco, Calif.

Application November 13, 1947, Serial No. 785,592

5 Claims. (Cl. 179—2.5)

This invention relates to carrier frequency communication systems, and particularly to signaling methods and equipment for use with such systems.

Among the objects of this invention are to provide signaling methods and apparatus which utilize, both to actuate the local ringing circuits and the carrier circuits, the regular ringing current which is used for purely local signaling, without special procedure on the part of the operator or even knowledge by the operator that a carrier circuit is being employed; to provide a carrier signaling system that requires no auxiliary generator of signaling currents for the carrier circuits or modulators for imposing the signaling currents thereon; to provide a system using the same frequency for signaling in both directions, yet which is responsive only to signals from the distant end of the carrier line and does not ring back locally when a distant station is to be signaled; and to provide a signaling system which does not require additional channels for signaling, and hence uses the carrier channels to the most effective advantage.

The signaling system of this invention is primarily adapted for use in the customary type of carrier current telephone system, wherein the two side-bands of a locally generated carrier, modulated by voice frequency signals, are utilized for carrying the messages in the two directions, and the carrier itself is suppressed. Considered broadly, the invention comprises imposing the carrier current itself upon the carrier frequency line as a signaling current. Preferably this is done by a relay actuated by the currents which are used locally for signaling on the voice frequency lines. At the receiving end a detector circuit is provided which is sharply responsive to the carrier frequency, which, in turn, operates a relay for impressing the signaling currents generated locally at the receiving end of the line onto the low frequency line there.

The system of my invention is applicable to any type of carrier-suppressed carrier current system, but it is especially applicable to the type of system which is described in my co-pending application, Serial Number 785,591 filed November 13, 1947, and accordingly I have illustrated in the drawings the invention as applied to such a system. The single figure is a circuit diagram of such a system with the ringing equipment of the present invention applied thereto. Parts of the circuits usually completed by cords or other exterior wiring are shown in dotted lines.

Referring to the drawings, the low frequency side of the carrier system connects to a local switchboard through lines 1 and 3. In its normal operating condition, that is, during the transmission of speech frequencies, these lines connect through the front contacts of a normally closed "receiving relay" 4 to lines 5 and 7. The line 5 leads directly, and the line 7 through an extension 7' to the input side of a hybrid transformer 9. As explained in the co-pending application above referred to, this hybrid transformer is supplied with the terminating network 10, and its output is applied through a transmitting pad 11 to a differential transformer 13. The differential transformer passes the voice frequencies on to a balanced modulator unit 15, such as a ring modulator. The latter is balanced with respect to the modulating currents but not with respect to the carrier itself, which is supplied by an oscillator 17.

The output circuit of the modulator feeds through an amplifier 19 to an output transformer 21. The latter has two output windings, the first of these, winding 23, is connected through line 25 and the back contacts of a relay 27 to a line 29, and thence through a directional filter 31 to a lead 33. This connects through another back contact of relay 27 to a lead 35 which connects with high-pass filter 37, passing both side-bands and the carrier, through a matching transformer 39 and so to the carrier frequency line 41.

A return circuit 43 from the line 41 passes back through the high-pass filter 37 and the directional filter 31 to the other side of the output coil 23 on transformer 21. A sharply selective series-resonant circuit, comprising an inductance 47, in series with a capacity 49, connects from the line 29 across the input of filter 31.

The action of the circuits just described, in modulating the voice frequencies upon the carrier and transmitting them to the carrier frequency line, has already been sufficiently described in the co-pending application above referred to. It is sufficient here to state that the output circuit from the modulator carries frequencies of the carrier and both side-bands, but that the carrier is suppressed through the effective short-circuiting action of the series-resonant circuit 47, 49. One side-band is filtered out by the directional filter 31, which also further attenuates any remaining carrier, and the other side-band is applied to the line as above stated.

The side-band which is attenuated by the transmitting directional filter is used for reception, and connects with the line through the same leads as have already been described in connection with filter 31 to the other directional filter 51. The output leads 53 from the directional filter 51 connect through a receiving pad 55 to the differential transformer 13. The latter is so balanced as to apply the received signals to the modulator 15, but not to the transmitting pad 11 and hybrid coil 9. The modulator serves also as a demodulator, and the output circuit, when used for this purpose, passes again through the amplifier 19. A second output coil 57 on the transformer 21 transfers the demodulated low frequency signals through a line 58 and a low-pass filter 59 back to the hybrid coil 9. The hybrid transformer is so balanced as not to transfer these signals back through the differential transformer, but instead, back to the lines 5 and 7 and so to the low frequency output lines 1 and 3 and thence to the switchboard.

It will be understood that the foregoing brief description of the carrier here shown is for illustrative purposes merely. The remainder of this specification will be devoted to a description of the signaling system itself, and its application to the carrier system described, from which it should be evident how the signaling system may be applied to other carrier current equipment.

In order to initiate a signal from the local switchboard, ringing current is supplied in the usual manner to the lines 1 and 3 from the local switchboard. The ringing current will here be assumed to be a 20-cycle alternating current, as is frequently used for such purposes, but D. C. or other ringing currents can be similarly used if desired. The ringing current is supplied to the lines 5 and 7 in the same manner as speech current. It passes through a branch circuit comprising leads 61 and 63, which is connected across the lines 5 and 7 and thence, through a condenser 65, to the actuating coil of the relay 27. This actuates the relay, and pulls the various contacts from the back to the front position.

The effects of the operation of the various sets of relay contacts are as follows: the upper contact leaf 66 disconnects the hybrid coil lead 7' from the lead 7, and connects it instead to a terminating resistance 67. The latter connects back through the lead 5 to the other side of the hybrid coil, and terminates the hybrid coil in its proper impedance, so that circulating currents which might set up oscillation in the modulator circuit are prevented. The second contact leaf 68 disconnects lead 25 from lead 29, leading to the directional filter and the short-circuiting network 47, 49, and connects it instead through a pad 69 to the lower contact which now connects through the contact leaf 70 directly with lead 35, the high-pass filter, and the carrier current line.

From the foregoing it will be seen that application of the normal ringing current to the low frequency line 1, 3, serves to impose the carrier frequency on the high frequency line. It will be obvious that as soon as the ringing current is cut off the relay 27 will release, restoring the normal functioning of the carrier system, so that it can receive its telephone messages. It remains to be shown how the receipt of carrier frequency by the system will serve to ring the low frequency line.

A branch circuit, responsive only to the carrier frequency itself, is bridged across the high frequency line 35, 43. This circuit may be traced from line 43 through lead 71 to a primary 73 on a matching transformer 75, and thence through the lead 77 to the lead 33 which connects through the contact leaf 70 back to lead 35.

The secondary coil 79 of the matching transformer connects to a sharply resonant series circuit, comprising condensers 81 and 83, and the inductor 85. The junction of condenser 81 and inductor 85 connects through a shielded lead 87 to the grid of a vacuum tube amplifier 89. The plate circuit of tube 89 can be traced through a lead 91 to the primary 93 of a transformer 95, and thence through the winding of the receiving relay 4 back through leads 97 and 99 to a suitable source of plate power, not shown. The negative lead from the power supply, 101, connects through a conventional biasing network 103 to the cathode of tube 89.

The carrier frequency arriving from the distant station is excluded from the modulator-demodulator circuit by the directional filters 31 and 51, and is applied to the resonant circuit 81, 83, 85, which is responsive to this frequency only, and thence appears on the grid of the tube 89. This tube is normally so biased that its plate current will hold the relay 4 in operation, with its front contacts closed, as shown. The tube amplifies the received radio frequency impulses, and imposes them, through the transformer 95, on a detector circuit which is coupled thereto.

The carrier frequency component from the plate circuit of the tube 89 is passed by the transformer 95 to the secondary 105, and is detected by a pair of rectifiers 107, thereby charging a condenser 109 bridged by a conventional grid-leak 111. The charge on the condenser is passed through a lead 112, resistor 113 and the coil 85, and appears as a negative charge on the grid of the tube 89 which serves to cut down its plate current. This action continues until the tube is biased nearly to cut-off, with the result that the relay 4 releases.

The charge on the condenser 109 is made effective to block the grid of tube 89 by means of the grid-return circuit. This comprises a connection from the lower side of the condenser through a series of resistors 115, and thence to the negative side of the plate supply circuit, lead 101. A second branch of the grid-return circuit connects from the bottom of condenser 109 through resistor 117 to lead 99 and the positive side of the plate supply.

In the equipment as actually used, the resistors 115 vary in value from about 250 ohms up to about 2,000 ohms, by geometric steps, so that the total resistance when all are in circuit is equal to about 3,000 ohms. These resistors are arranged so that they may be strapped out, in order to adjust the gain of the amplifier or, in other terms, its sensitivity to the carrier frequency signals. The resistor 117 is, in this equipment, of about 70,000 ohms. The network comprising this resistor and the resistors 115 act as a voltage divider. When all of the resistors 115 are strapped out the grid return leads directly to the negative side of the plate supply, and the effect of a negative bias on the condenser 109 is at its maximum. When the condensers are all in circuit a material positive voltage appears across the resistors, and this must be overcome by the negative bias on the grid 109 before the tube cuts off and the relay 4 releases.

In this manner it is possible to predetermine the speed with which the signaling circuit will act. The circuit exercises a twofold purpose. The first is to act as a gain control. The second is to vary, not the gain as such, but the threshold sensitivity of the device. It is frequently the case that due to some slight unbalance a small component of the carrier frequency may appear in the output carrier frequency line even during the normal connection for voice frequency transmission. This will be too small normally to affect the transmission or cause difficulties, but it may be sufficient, when acting over considerable periods, to build up enough of a charge to cause the local ringing circuit to actuate. By setting a threshold value by means of the voltage divider network this effect can be overcome, for the locally generated carrier will have a constant value, and will build up a negative bias of constant value. The resistors 115 are merely adjusted to buck out this bias. Additional carrier from the transmitting end will then over-balance the positive bias from the divider and de-energize the relay. The carrier frequency as thus generated at the near end or transmitting end of the line is always too weak to affect materially the transmission or to actuate the receiving end of the circuit.

Release of the relay 4 transfers the contact leaves 118 and 119 from lines 5 and 7, and connects the line instead across a ringing generator 120. This actuates the drop or other signal on the switchboard. The intensity of the ringing current can be adjusted by a pad 119', provided for the purpose. At the same time contact leaf 121 connects the resistor 67 across lines 5 and 7, so that the hybrid coil remains in balance.

It will be understood that the detector circuit that has been described for receiving and actuating the local ringing relay is only one of many that can be used, but we prefer it because of its stability and ease and permanence of adjustment. It will also be understood that other connections can be used for imposing the carrier frequency upon the line. I therefore do not wish to be limited to the exact composition of apparatus which has here been described, but desire to be protected within the scope of the ensuing claims.

I claim:

1. In a carrier current communication system comprising a transmission line, a generator of carrier frequency current and means for modulating a message current thereon to produce side-band frequencies to carry the communication; a circuit sharply selective to the carrier frequency normally connected across said line effectively to short-circuit said carrier frequency, a local signaling circuit, a low frequency message circuit, means operated from said local circuit to open said selective circuit, a sharply selective receiving circuit resonant to said carrier frequency, a rectifier coupled to said receiving circuit, a relay actuated by rectified carrier frequency from said receiving circuit connected to switch said local signaling circuit onto said low frequency message circuit, and means for opening said receiving circuit operative concurrently with said means for opening said first mentioned selective circuit, whereby said receiving circuit is inoperative by carrier frequencies imposed on the line locally.

2. In a carrier communication system, wherein the carrier frequency is used for signaling and side-bands of said carrier are used to transmit the communications, means for receiving the carrier signals and translating them onto a voice frequency line comprising a circuit sharply resonant to the carrier frequency as distinguished from the side-bands bridged across said line, an amplifier tube connected to amplify resonant frequencies in said resonant circuit, a relay connected in the output of said amplifier tube and adjusted for actuation by the normal output current thereof, a detector circuit coupled to said amplifier output, connections from said detector circuit for applying rectified currents therein to bias said amplifier so as to reduce its output current below normal and thus release said relay and connections to contacts on said relay for imposing signaling current on said voice frequency line when said relay is released.

3. In single side-band carrier current terminal equipment for connecting between a low frequency line and a carrier frequency line, signaling apparatus comprising a modulator unbalanced with respect to the carrier for applying carrier frequency to said carrier frequency line, a sharply series-resonant circuit having substantially zero reactance to said carrier frequency and relatively high impedance to side-bands generated by said modulator normally connected across the output of said modulator and said carrier frequency line, a directional filter interposed between the output of said modulator and said carrier frequency line, a by-pass circuit around said series-resonant circuit and said filter, a transfer relay connected for actuation by signaling currents from said low frequency line, and connections on said relay for transferring the output circuit of said modulator from said series-resonant circuit and said filter to said by-pass circuit.

4. Apparatus in accordance with claim 3 including a second circuit sharply series-resonant to said carrier frequency for connection directly across said carrier frequency line, an amplifier tube connected across one element of said series-resonant circuit, a second relay normally excited by space current flowing in said amplifier, a detector circuit coupled to the output of said amplifier, connections from said detector circuit for biasing said amplifier substantially to cut-off to release said second relay, a local source of signaling current, contacts on said second relay for applying signaling current to said low frequency line on release thereof, and interconnections between additional contacts on both of said relays to prevent operation of either from affecting the other.

5. In carrier current terminal equipment for connecting between a low frequency line and a carrier frequency line, signal-receiving equipment for translating a signal of the carrier frequency itself into a ringing signal on said low frequency line comprising a circuit sharply series-resonant to said carrier frequency adapted for connection directly across said carrier frequency line, an amplifier tube having an input circuit connected across an element of said series-resonant circuit, an anode circuit for said amplifier tube including a relay actuated by the normal current in said anode circuit, a detector circuit coupled to said anode circuit, connections from said detector circuit for biasing said amplifier tube toward cut-off upon excitation of said detector circuit to release said relay, a local source of signaling current for said low frequency line, and contacts on said relay for applying said signaling current to said low frequency line upon release of said relay.

LENNART G. ERICKSON.

REFERENCES CITED

The following references are of record in the file of this patent:

UNITED STATES PATENTS

| Number | Name | Date |
|---|---|---|
| 1,454,532 | Beatty | May 8, 1923 |
| 1,472,821 | Affel | Nov. 6, 1923 |
| 2,094,681 | Sears | Oct. 5, 1937 |
| 2,179,414 | Konkle | Nov. 7, 1939 |
| 2,215,482 | Skillman | Sept. 24, 1940 |
| 2,215,483 | Skillman | Sept. 24, 1940 |